United States Patent [19]

Suzuki et al.

[11] 4,453,812

[45] Jun. 12, 1984

[54] AUTO-FOCUS DEVICE FOR CAMERA

[75] Inventors: Ryoichi Suzuki, Kanagawa; Ryuji Tokuda, Tokyo, both of Japan

[73] Assignee: Canon Kabushiki Kaisha, Tokyo, Japan

[21] Appl. No.: 409,861

[22] Filed: Aug. 20, 1982

[30] Foreign Application Priority Data

Aug. 26, 1981 [JP] Japan .................. 56-134443

[51] Int. Cl.³ .................. G03B 3/10; G03B 7/093
[52] U.S. Cl. .................. 354/403; 354/484; 354/238.2
[58] Field of Search ............ 354/25, 50, 238

[56] References Cited

U.S. PATENT DOCUMENTS 4,350,418  9/1982  Taguchi et al. .................. 354/25

*Primary Examiner*—Michael L. Gellner

*Attorney, Agent, or Firm*—Toren, McGeady and Stanger

[57] ABSTRACT

The present invention relates to auto-focus devices for cameras. In the camera having an auto-focus device, initiation of exposure is deferred pending termination of a distance adjusting operation by the auto-focus device. The aforesaid sequence assures that distance adjusting is completed before the exposure starts, provided that operation is normal. But when the distance adjusting operation is not motivated, it results not only in an exposure not starting, but also in current flow to the auto-focus circuit being retained and thus electrical energy is wastefully consumed. The present invention has been made by consideration of this point. When the auto-focus device does not complete a distance adjusting operation in a prescribed time, the actuation of the auto-focus device stops, thus preventing wasteful consumption of electrical energy.

10 Claims, 10 Drawing Figures

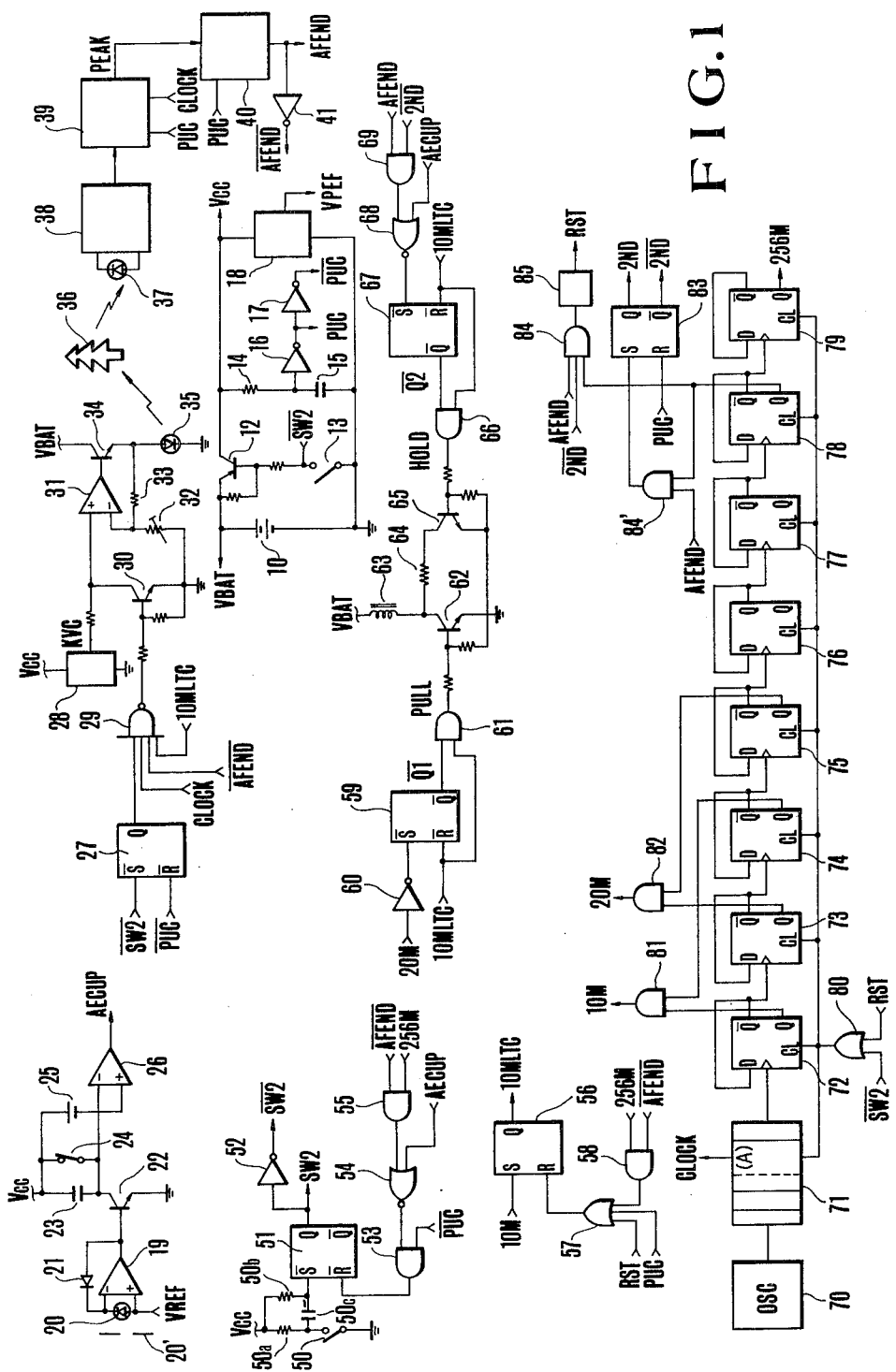
F I G. 1

AUTO-FOCUS DEVICE FOR CAMERA

BACKGROUND OF THE INVENTION

1. Field of the Invention

This invention relates to cameras, and more particularly to cameras with automatic focusing devices.

2. Description of the Prior Art

Usually, the automatic focusing device is arranged in the camera so that after the end of a focusing operation, a transit to a shutter operation occurs. Since actuation of a shutter release immediately follows setting to the in-focus condition, and because the time the focusing operation takes to complete is a variable factor, the timing of the start of a shutter release, or the instant of shutter operation shifts unpredictably. In more detail, it is common practice that the scanning operation of the lens always goes in one direction, either from close up to infinity, or from infinity to close up. Therefore, in an example of the former case, when shooting a nearby object, the shutter starts to open as soon as a camera release actuation takes place. Conversely when shooting an infinite distant object, after the elapse of some appreciable time from a camera release actuation the shutter is released.

From the standpoint of insuring adequate shutter operation, it is desirable that every exposure operation has, despite differences in object distance, to proceed just after the release button is pushed down. In considering the up-to-date available automatic focusing mechanism, this object is very difficult to attain. Rather, the dependence of the initiation of the exposure operation on the object distance gives the photographer needless trouble when shooting a moving object. With this in mind, according to a proposal, for example, in Japanese Laid-Open Patent No. Sho 55-40438, shutter opening is initiated in a predetermined period after a camera release is actuated, thereby eliminating the above-described drawback.

The above-cited proposal makes use of a logic product ("AND") condition of a signal representing the end of an automatic focus adjustment (hereinafter referred to as "AFEND" signal) and a timer-up signal produced in a predetermined period from the camera release actuation in determining when the shutter starts to open. Since this period of timer actuation is so chosen to cover almost all the different times the automatic focus adjustment for different object distances will take to end, for almost every object, the time interval until the shutter opens becomes constant. However, this proposal also has the following drawback.

That is, in application to the passive type of automatic focusing devices using CCD, for example, when the object brightness is low, or when the object is of a vertical stripe pattern, the production of the AFEND signal often fails. Also, in application to the active type of automatic focusing devices using infrared light-emitting diodes (hereinafter abbreviated as "IRED"), for example, when reflection of the object is low, often no AFEND signal is produced. When the AFEND signal is not given, it follows that where transit to the next sequence is conditioned by the "AND" of the aforesaid timer-up signal and the AFEND signal, that because of the lack of the AFEND signal, there is no opportunity for any of the subsequent steps of operation to proceed. This implies that, in the system using an electrical power latch and the IRED, the electrical power source remains in the latched state, permitting the aforesaid IRED to continue lighting with the result that the amount of current wastefully consumed greatly increases.

Certainly, allowing for situations where the aforesaid automatic distance measurement is difficult, an equivalent to the AFEND signal may be formed. That is, in the passive type, that signal represents a certain fixed object point, and, in the active type, it represents that the lens has reached the focusing position for an infinitely distant object. However, much remains to cause production failure of the AFEND signal, many of which are accidents. For example, motion of the lens mounting mechanism is not smooth, or may be interrupted. If so, the above-described problem will arise.

It is an object of the present invention to provide an automatic focusing device using a reference light or like signal for projection onto an object to be photographed in forming object distance adjustment, wherein when an AFEND signal is not obtained within a prescribed time, the distance finding operation is automatically inhibited to avoid wasteful consumption of electrical energy.

Still another object of the present invention is to establish a system which can eliminate the above-described drawbacks by providing a 2nd timer means actuated when counting of a 1st timer means ends.

In one embodiment, when an AFEND signal appears within the earliest prescribed time (hereinafter called "1st" short time) defined by the 1st timer means, the procedure is similar to that in the conventional device. When the AFEND signal appears in another prescribed time contiguous to the 1st one defined by the 2nd timer means (hereinafter called "2nd" short time), a subsequent operation proceeds almost immediately. Furthermore, when the AFEND signal is not produced even after termination of the 2nd short time, actuation of the shutter release is prohibited, for example, by releasing the latching of the electrical power source, and the system is reset to the initial position assumed before actuation of the camera release.

The present invention has the following advantages:

(1) The use of the 1st timer means of a similar function as that in the conventional device provides the assurance of obtaining a certain shutter operation in ordinary photography.

(2) As the governor controlling the speed of movement of the focusing mechanism in the lens mounting is slow in action due to lowering of the ambient temperature, even when timing the appearance of the AFEND signal is delayed, it is possible by provision of the 2nd timer means that, as long as its period of actuation goes on, the accuracy and reliability of the focusing control mechanism operation is maintained at an acceptable level.

(3) Even when the AFEND signal does not arrive due to some accident, the initial state prior to camera release is regained in automatic response to termination of a counting operation of the 2nd timer means, thereby increasing consumption of current which would otherwise occur as in the conventional device, and a rapid shortage of electrical energy in the battery can be avoided.

These and other objects, features and advantages of the invention will become apparent from the following detailed description of embodiments thereof by reference to the drawings.

SUMMARY OF THE INVENTION

It has now been found that these objects of the invention may be obtained in a focusing device including a battery circuit and an auto-focus circuit operating responsive to current supply from the battery circuit. The auto-focus circuit produces an output signal representing a termination of a focusing operation and the apparatus also has prohibiting means for forcibly prohibiting the operation of the auto-focus circuit when the output signal is not produced in a prescribed time after the initiation of the auto-focus operation.

BRIEF DESCRIPTION OF THE DRAWINGS

FIG. 1 is a schematic view, partly in block form, of one embodiment of an electrical circuit according to the present invention.

DESCRIPTION OF THE PREFERRED EMBODIMENTS

Figure 2A:
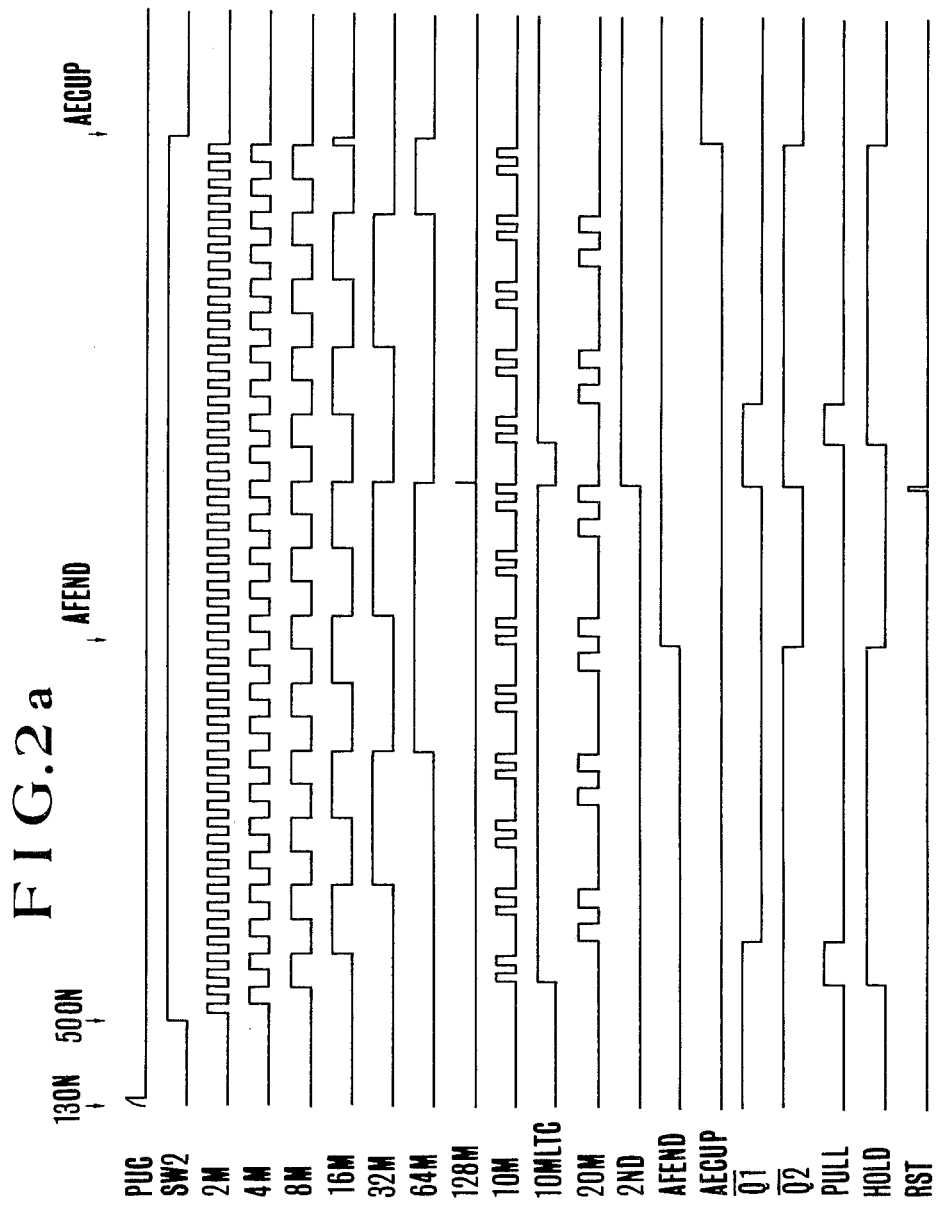
FIGS. 2(a), (b) and (c) are pulse timing charts illustrating three different modes of operation of the circuit of FIG. 1.

A first embodiment of an electrical circuit is illustrated in FIG. 1. The principles of design of this embodiment are as follows:

(1) There is provided an automatic focusing device of the active type using a light projecting element such as an infrared light-emitting diode (IRED).

(2) The AF operation and the exposure operation are controlled by one electromagnet. In more detail, a 1st attracting operation of an electromagnet starts movement of the lens mounting from a position for the object at the nearest focusable distance. Disappearance of the attractive force responsive to detection of the in-focus condition results in stopping the lens mounting from further movement. Then, a 2nd attracting operation starts an opening operation of the shutter. Upon disappearance of the attractive force, the shutter is closed, terminating the exposure. Furthermore, an electrical power source latching function is imparted thereto.

(3) The counting period of the 1st timer means, beginning with the start of attraction of the electromagnet (1st short time), is taken at 128 milli seconds. Assuming that an AFEND signal was produced within this period, after the termination of the 1st short time, when a time of 10 milli seconds has elapsed, transit to the attracting operation of the electromagnet for opening the shutter occurs. A time interval from the termination of 128 msec., counting from the start of the 1st attracting operation of the electromagnet to a moment at which a time of 246 msec. elapses, is taken as the counting period of the 2nd timer means (the 2nd short time). Assuming that the AFEND signal was produced within this period, it is within 10 msec. from the occurrence of said AFEND signal that transit takes place to the attracting operation of the electromagnet for opening the shutter. Alternatively, assuming that the AFEND signal is not produced within the period of the 2nd short time, then transit to the shutter operation does not take place and instead electrical power source latching is released to regain the initial state.

Turning now to FIG. 1, there are shown an electrical power source or battery 10, a transistor 12 for latching the battery 10, a main switch 13 on a camera housing (not shown), a resistor 14 constituting an integrator circuit together with a condenser 15, and inverter circuits 16 and 17. When the electrical power source 10 is thrown, one positive pulse is produced at the output of the inverter circuit 16, serving as a power-up clear pulse (PUC), and one negative pulse $\overline{PUC}$ is produced at the output of the other inverter circuit 17. A reference voltage forming circuit 18 produces a reference voltage in proportion to a temperature to be described later. An operational amplifier 19 (hereinafter abbreviated as "OP amp") constituting a head amplifier for a photosensitive element has two inputs across which is connected a photogalvanic effect type light receiving element 20 for light measurement. Connected in the feedback path thereof is a diode 21 for logarithmic compression. A transistor 22 for elongation has its base connected to the output of the OP amp. 19, and has its collector connected to a timing condenser 23. A count start switch 24 is connected in parallel to the timing condenser 23. A comparator 26 has its (−) input connected to the collector of the transistor 22 and its (+) input, to which is applied a reference voltage 25 from the positive terminal Vcc of the battery 10, and has an output at which is produced an AECUP signal representing the exposure time count up. An RS flip-flop circuit 27 (hereinafter abbreviated as RS-FF) has its set input receptive of an $\overline{SW2}$ to be described later, and its reset input receptive of the aforesaid $\overline{PUC}$ signal. A NAND gate 29 has four inputs to which are applied the Q output of the aforesaid RS-FF 27, a clock signal (to be described later), an AFEND signal and a 10MLTC signal. A switching transistor 30 has its base connected to the output of the NAND gate 29 through a resistor. An OP amp. 31 constitutes part of a driving circuit for a light projecting element or IRED, with its (+) input connected to the collector of the aforesaid switching transistor 30 and further connected through a resistor to a reference voltage output KVC of a reference voltage forming circuit 28. An npn transistor 34 for driving the IRED has its base connected to the output of the OP amp. 31 and has its emitter connected to the IRED (infrared light-emitting diode) 35 as the light projection element, and also to a series-connected circuit of resistors 32 and 33, the voltage dividing point of resistors 32 and 33 being connected to the (−) input of the aforesaid OP amp 31. Reference numeral 36 identifies an object to be photographed. A photogalvanic effect type light sensitive element 37 is positioned to receive the reflected infrared light from the object 36. Reference numeral 38 identifies an amp.; a peak detection circuit 39 is receptive of the aforesaid PUC signal and a clock signal to be described later. An AFEND signal forming circuit is receptive of the aforesaid PUC signal. Since these parts 38, 39 and 40 are proposed in, for example, Japanese Laid-Open Patent No. Sho 56-52726, no explanation about their detailed construction is given here. An inverter circuit 41 is connected to the output of the aforesaid AFEND signal forming circuit 40 and produces an $\overline{AFEND}$ signal. Reference numeral 50 identifies a release switch. Resistors 50a and 50b and a condenser 50 constitute a differentiation circuit. An RS flip-flop circuit 51 (hereinafter abbreviated as RS-FF) has its set terminal connected to the output of the aforesaid differentiation circuit (50a, 50b, 50c) and its reset terminal connected to the output of an AND gate 53, to be described later. An inverter circuit 52 has its input connected to the Q output SW2 of the RS-FF 51 and produces an $\overline{SW2}$ signal at the output thereof. The AND gate 53 has two inputs, one of which is receptive to the aforesaid $\overline{PUC}$ signal and the other which is connected to the output of a NOR gate 54. Applied to the two inputs of the aforesaid NOR gate 54 are an AECUP signal and the output of an AND gate 55. Applied to the two inputs of the AND gate 55 are the $\overline{AFEND}$ signal and a 256M signal, to be described later. An RS-FF 59 has its set input receptive to an inverted signal of a 20M signal, to be described later, by an inverter circuit 60 and its reset input receptive to a 10MLTC signal, to be described later. An AND gate 61 has two inputs, one which is connected to the $\overline{Q}$ output $\overline{Q1}$ of the RS-FF 59 and the other which is receptive to the 10MLTC signal, and has an output which is connected through a resistor to a transistor 62 for driving pull-current. Reference numeral 63 identifies a coil of the electromagnet. An AND gate 69 has two inputs receptive to the AFEND signal and a $\overline{2ND}$ signal, to be described later. A NOR gate 68 is receptive to the output of the aforesaid AND gate 69 and the AECUP signal. An RS-FF 67 has its set input connected to the output of the aforesaid NOR gate 68 and its reset input receptive to the 10MLTC signal. An AND gate 66 has two inputs receptive to the $\overline{Q}$ output $\overline{Q2}$ of the aforesaid RS-FF 67 and the 10MLTC signal. A transistor 65, for driving hold current of the electromagnet, has its base connected through a resistor to the output of the aforesaid AND gate 66. Reference numeral 64 identifies a hold current control resistor. An RS-FF 56 has its set input receptive to a 10M signal, to be described later. An AND gate 58 has two inputs receptive to the $\overline{AFEND}$ signal and a 256M signal, to be described later. An OR gate 57 has three inputs receptive to an RST signal, to be described later, the PUC signal and the output of the AND gate 58, and has its output connected to the reset terminal of the RS-FF 56. Also at the Q output of RS-FF 56 is produced the 10MLTC signal. Reference numeral 70 identifies an oscillator circuit; a frequency dividing circuit 71 with its predetermined output stage (A) produces a clock signal of 10 KHz. D flip-flop circuits 72 to 79 (hereinafter abbreviated as D-FF) constitute an 8-stage T-FF frequency divider circuit where the Q output of each D-FF is connected to its own D input and also to the clock terminal of the next-stage D-FF. And OR gate 80 has two inputs receptive to the $\overline{SW2}$ signal and an RST signal, to be described later, and has its output connected to the clear terminals of the frequency dividing circuit 71 and D-FFs 72 to 79. An AND gate 81 has two inputs receptive to the Q output (2M signal) of the D-FF 72 and the Q output (8M signal) of the D-FF 74 and produces a 10M signal at the output thereof. An AND gate 82 has two inputs receptive to the Q output (4M signal) of the D-FF 73 and the Q output (16M signal) of the D-FF 75 and produces a 20M signal at its output. Here, 10M, 20M, ... mean that the thus-headed signals invert to H level in 10 msec., 20 msec., ... from the release of the CLEARs of the D-FFs 72 to 79. An AND gate 84' has two inputs receptive to the AFEND signal and the Q output (128M signal) of the D-FF 78. An RS-FF 83 has its set input connected to the output of the aforesaid AND gate 84' and its reset input receptive to the PUC signal, and produces the 2ND and the $\overline{2ND}$ signal at the Q and $\overline{Q}$ outputs thereof respectively. An AND gate 84 has three inputs receptive to the AFEND signal, the $\overline{2ND}$ signal and the 128M signal and has its output connected to a one-shot circuit 85 which produces the RST signal at the output thereof.

The operation of the circuit of FIG. 1 will be explained by reference to the pulse timing charts of FIG. 2.

At first, the AFEND signal is assumed to appear within the period of time counting of the 1st timer means (see FIG. 2(a)).

When the main switch 13 is closed in response to pushing down of a camera shutter button (not shown), the transistor 12 for latching the electrical power source is supplied with base current, thereby the transistor 12 is turned on, and all are supplied with the battery voltage Vcc. Then, the PUC signal of a duration depending upon the resistor 14 and the condenser 15 and its inverted signal or $\overline{PUC}$ signal are produced from the inverter circuits 16 and 17 respectively, and are applied to reset RS-FFs 51, 56, 27 and 83 initially. Therefore, the Q output SW2 of the RS-FF 51 is held at L level, and the output $\overline{SW2}$ of the inverter circuit 52 at H level. Therefore, the output of the OR gate 80 takes H level by which the frequency divider circuit 71 and the D-FFs 72 to 79 are cleared up. Since the Q output (10MLTC signal) of the RS-FF 56 is of L level, the RS-FFs 59 and 67 are also reset with their $\overline{Q}$ outputs $\overline{Q1}$ and $\overline{Q2}$ being set at H level. The peak detection circuit 39 and the AFEND signal forming circuit 40 are also reset to the initial state by the PUC signal.

Then, when the switch 50 is closed in response to actuation of a shutter release, the differentiation circuit (50a, 50b, 50c) produces a negative pulse which sets the RS-FF 51, thereby its Q output SW2 is changed to H level. Then, the output $\overline{SW2}$ of the inverter circuit 52 is changed to L level. Therefore, the output of the OR gate 80 also changes to L level since the RST signal remains of L level, thereby the frequency divider circuit 71 and the D-FFs 72 to 79 are released from the cleared state. Thus a frequency dividing operation starts. In 10 msec., the output 10M of the AND gate 81 is changed to H level so that the RS-FF 56 is turned on and its Q output is changed to H level. Thus the 10MLTC signal is produced. Since the RS-FF 59 has been set with its $\overline{Q}$ output $\overline{Q1}$ at H level, the output of the AND gate 61 is, therefore, changed to H level, and the transistor 62 supplies pull current to the coil 63 of the electromagnet, thereby the focusing lens holder is released from latching connection, by means to be described later, and starts to move.

Such changes of the $\overline{SW2}$ signal to L level causes RS-FF 27 to be set with its Q output changed to H level. Furthermore, since the 10MLTC signal is of H level, and the AFEND signal is not produced yet, the NAND gate 29 produces a train of pulses with the same frequency as that of the clock signal (10 KHz). Responsive to this, the switching transistor 30 repeatedly turns on and off. When the transistor 30 is turned off, the IRED 35 gives off light under the action of the OP amplifier 31 because it results in application of a certain voltage determined by the reference voltage KVC and the voltage divider of the resistors 32 and 33 thereon. When in the ON position, on the other hand, the IRED 35 is not lighted. As a result, a pulsated light of 10 KHz is projected from the IRED 35 onto the target area. As scanning goes on, when the object in the target area reflects the projected infrared light to the photosensitive element 37, the output of the element 37 in the amplified form by the amplifier 38 reaches a peak value sensed in synchronism with the lock signal by the peak detecting circuit 39, which then produces a peak signal. In a prescribed time period from the appearance of the peak signal, an AFEND signal is produced from the $\overline{\text{AFEND}}$ signal forming circuit 40, and an $\overline{\text{AFEND}}$ signal from the inverter circuit 41. The AFEND signal is a latch signal. Within 10 msec. from the inversion of the output of AND gate 81 to H level, the output 20M of the AND gate 82 inverts to H level, and the output of the inverter circuit 60 inverts to L level. Therefore, the RS-FF 59 is set with its $\overline{\text{Q}}$ output $\overline{\text{Q1}}$ changed to L level. Then, the output of the AND gate 61 is changed to L level at which time the transistor 62 is turned off to stop the pull current supply. Even after the pull current supply is cut off, the $\overline{\text{Q}}$ output $\overline{\text{Q2}}$ of the RS-FF 67 remains at H level, so that the output of the AND gate 66 holds H level and the transistor 65 remains ON, permitting a hold current defined by the limit resistor 64 to continue flowing to the coil 63 of the electromagnet. Thus, the attracting function of the electromagnet is fully sustained. Now, when the AFEND signal arises here, it follows that, since the RS-FF 83 has been reset by the PUC signal so that the $\overline{\text{2ND}}$ signal has taken H level, the two inputs of the AND gate 69 simultaneously take H level which in turn causes its output to change to H level. Therefore, the output of the NOR gate 68 inverts to L level by which the RS-FF 67 is set with its $\overline{\text{Q}}$ output $\overline{\text{Q2}}$ inverted to L level. Then, the output of the AND gate 66 inverts to L level, thereby the transistor 65 is turned off to stop the hold current supplied to the coil 63 of the electromagnet. Thus, as the attractive force of the electromagnet disappears, the focusing lens holder is arrested to terminate the focusing operation.

Production of the AFEND signal also causes the NAND gate 29 to produce an output of H level thereafter, since the $\overline{\text{AFEND}}$ signal becomes L level. Therefore, the transistor 30 moves from ON-and-OFF repeated to continuously ON where the transistor 34 is turned off. Therefore, IRED 35 no longer gives off light.

After that, as the frequency dividing operation of the D-FFs 72 to 79 goes on, when the Q output of the D-FF 78 inverts to H level with the production of a 128M signal, it follows that since the AFEND signal and the $\overline{\text{2ND}}$ are of H level, the output of the AND gate 84 inverts to H level. Responsive to this, the one-shot circuit 85 produces a reset pulse RST which is then applied through the OR gate 80 to clear up the frequency dividing stage 71 and the D-FFs 72 to 79. Again, the aforesaid reset pulse RST is also applied through the OR gate 57 to reset the RS-FF 56 with its Q output of the 10MLTC signal inverted to L level. Then the RS-FFs 67 and 59 are reset with their $\overline{\text{Q}}$ outputs $\overline{\text{Q2}}$ and $\overline{\text{Q1}}$ inverted to H level.

Upon removal of the aforesaid reset pulse RST, a 2nd frequency dividing operation of the D-FFs 72 and 79 starts. In 10 msec., the output of the AND gate 81 or the 10M signal inverts to H level, thereby the RS-FF 56 is set with its Q output or 10MLTC signal inverted to H level. Since, when the 10MLTC signal was of L level, the RS-FFs 59 and 67 were reset with their $\overline{\text{Q}}$ output $\overline{\text{Q1}}$ and $\overline{\text{Q2}}$ inverted to H level, then when the 10MLTC signal inverts to H level, the outputs of the AND gates 61 and 66 are also inverted to H level, and the switching transistor 62 is turned on to start a 2nd supply of pull current to the coil 63 of the electromagnet. This starts an opening operation of the shutter. Within 20 msec. from the removal of the RST signal, the output of the AND gate 82 or the 20M signal inverts to H level so that the output of the inverter circuit 60 inverts to L level, thereby the RS-FF 59 is set with its $\overline{\text{Q}}$ output $\overline{\text{Q1}}$ inverted to L level. Therefore, the output of the AND gate 61 also inverts to L level, by which the switching transistor 62 is turned off stopping the pull current supplied to the electromagnet. On the other hand, the transistor 65 continues conducting, and, therefore, the hold current continues flowing to the electromagnet, thus retaining the shutter in the open position. Almost simultaneously with the aforesaid start of the opening of the shutter, the count start switch 24 opens, and the timing condenser 23 is charted by a time constant current depending upon the intensity of light incident upon the photosensitive element 20 behind the auxiliary diaphragm 20'. When the voltage stored on the timing condenser 23 has reached a prescribed level, as the ($-$) input level of the comparator 26 falls below the ($+$) input level, the output of the comparator 26 changes to H level, thus producing an AECUP signal. Responsive to this signal, the NOR gate 68 changes its output to L level. Therefore, the RS-FF 67 is set with its $\overline{\text{Q}}$ output $\overline{\text{Q2}}$ inverted to L level, and the output of the AND gate 66 is also inverted to L level. Then, the transistor 65 is turned off cutting off the hold current supplied to the electromagnet. Thus, closing of the shutter is initiated. Such production of the AECUP signal also causes inversion of the output of the NOR gate 54 to L level which in turn causes inversion of the AND gate 53 output to L level. Thereby, the RS-FF 51 is reset with its Q output inverted to L level. Then, the inverter circuit 52 output is inverted to H level. Thus, the $\overline{\text{SW2}}$ signal disappears. Therefore, the latching transistor 12 is turned off to release the battery 10 from latching. Upon detection of the occurrence of the AFEND signal in the 1st short time by the 1st timer means, it is at the termination of the 1st short time that the next sequence takes place.

Figure 2B:
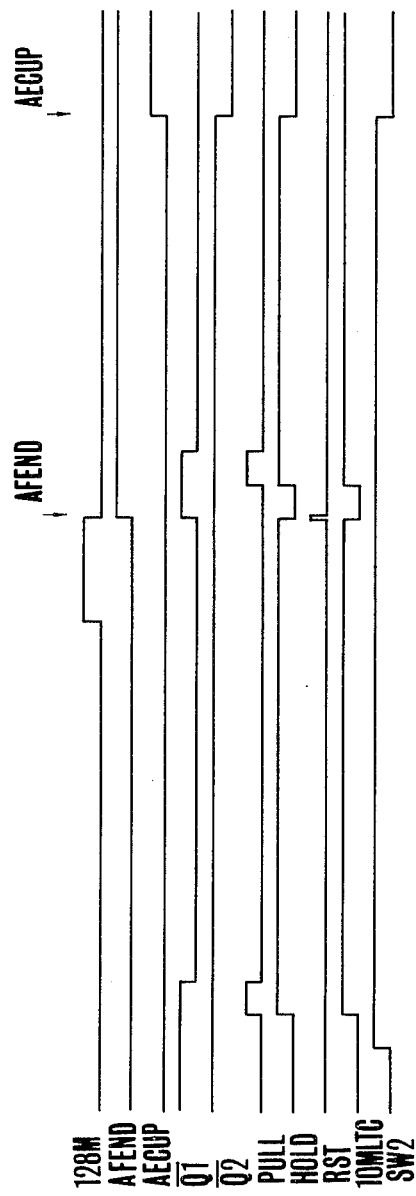

Next, explanation is given in conjunction with an alternative case where the AFEND signal arises in the 2nd short time period by the 2nd timer means by reference to FIG. 2(b). The operation of the circuit of FIG. 1 is as follows:

Since, in this case, an AFEND signal is not produced within 128 msec. from the occurrence of the $\overline{\text{SW2}}$ signal, the production of a 128M signal does not change the output of the AND gate 84 from L level. Because of the lack of an RST signal, therefore, the D-FFs 72 to 79 are not reset and the frequency dividing operation transists to the 2nd short time period. Here an AFEND signal is assumed to arise. Then, because of the $\overline{\text{2ND}}$ signal being of H level, the AND gate 69 inverts to H level. Then, the output of the NOR gate 68 inverts to L level, thereby the RS-FF 67 is set with its $\overline{\text{Q}}$ output $\overline{\text{Q2}}$ inverted to L level. Then, the output of the AND gate 66 inverts to L level, thereby the switching transistor 65 is turned off. Therefore, the hold current supplied to the electromagnet stops, and motion of the lens barrel stops. Thus the focusing operation is terminated. Also, since the production of the AFEND signal changes the $\overline{\text{AFEND}}$ signal to L level, the output of the NAND gate 29 inverts to H level, thereby the switching transistor 30 is turned on to de-energize IRED 35. Also, since the 2ND signal and the 128M signal remain at H level in the moment at which the AFEND signal arises, or the AFEND signal changes to H level, the production of the AFEND signal causes inversion of the output of the AND gate 84 to H level, which in turn causes the one-shot circuit 85 to produce a pulse RST, thereby the D-FFs 72 to 79 are all reset once. Then, the D-FFs 72 to 79 again start a frequency dividing operation from the initial state. The subsequent or shutter operation proceeds similar to that described in the former case, and, therefore no more detailed explanation is given here.

Figure 2C:
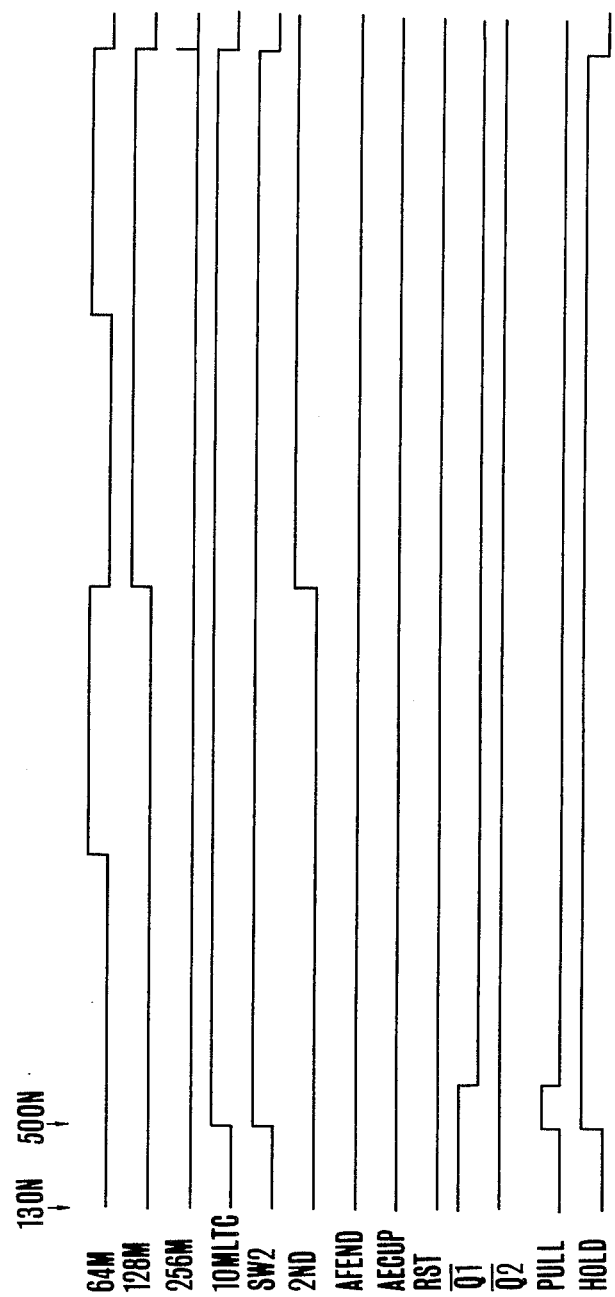

Next, when no AFEND signal is produced in the 2nd short time period by the 2nd timer means, the circuit of FIG. 1 operates as follows (see FIG. 2(c)).

Since, in this case, the $\overline{\text{AFEND}}$ signal is held even during the 2nd short time, the termination of the 2nd short time causes inversion of the Q output of the D-FF 79 to H level, or production of a 256M signal, which in turn causes the output of the AND gate 55 to invert to H level. Then, the outputs of the NOR gate 54 and the AND gate 53 invert to L level, thereby the RS-FF 51 is reset with its Q output SW2 inverted to L level. Then, the output $\overline{\text{SW2}}$ of the inverter circuit 52 inverts to H level. Therefore, the battery latching transistor 12 is turned off to release the battery from the latching state. Also, since the production of the 256M signal results in inversion of the outputs of the AND gate 58 and the OR gate 57 to H level, the RS-FF 56 is reset with its Q output or 10MLTC inverted to L level. Therefore, the output of the AND gate 66 inverts to L level, thereby the switching transistor 65 is turned off. Thus, the hold current supplied to the electromagnet stops. Disappearance of the 10MLTC signal also causes inversion of the output of the NAND gate 29 to H level. Then the switching transistor 30 turns on. Thus the IRED 35 is not lighted.

Figure 3:
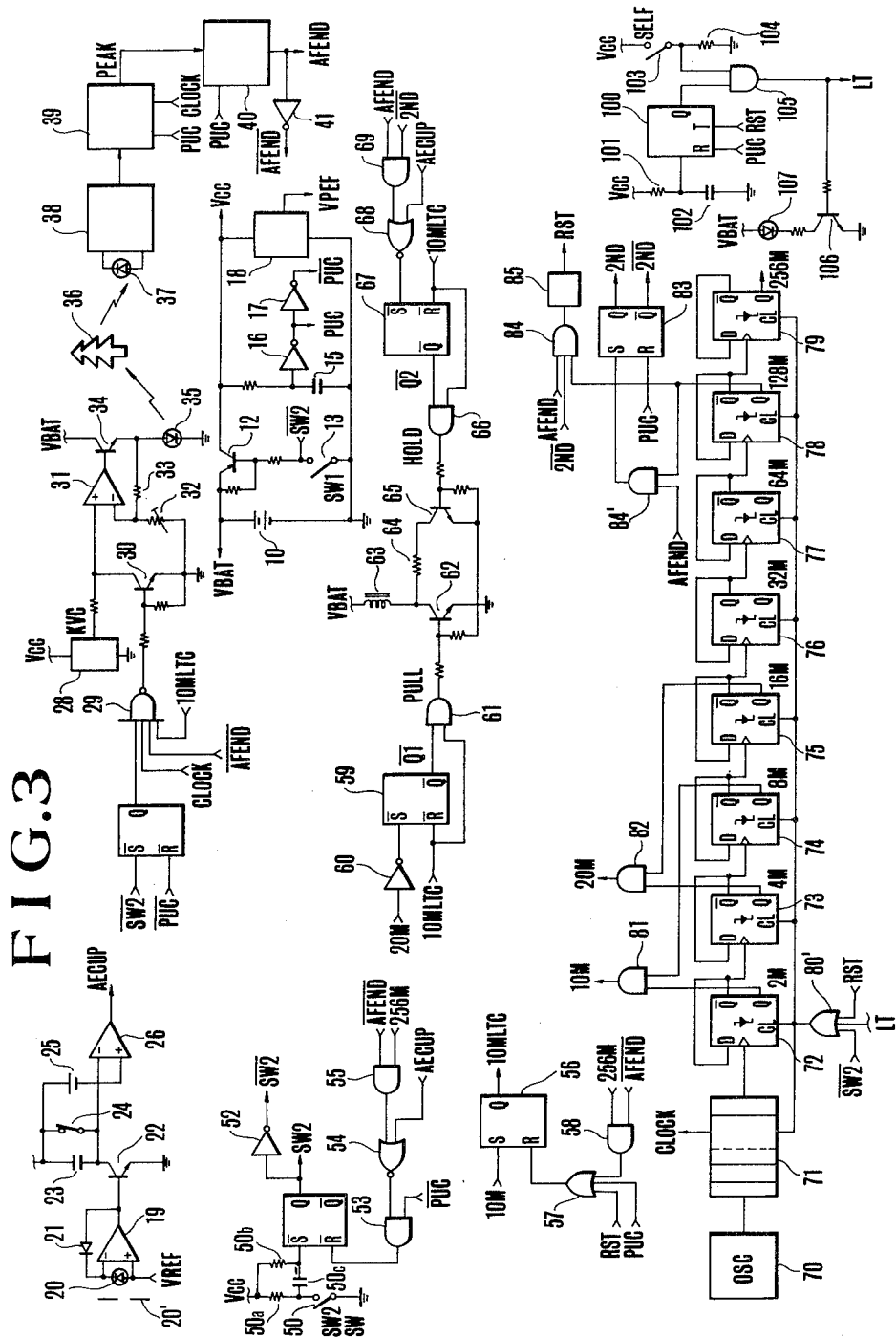
FIG. 3 illustrates another embodiment of the present invention.
Figure 4:
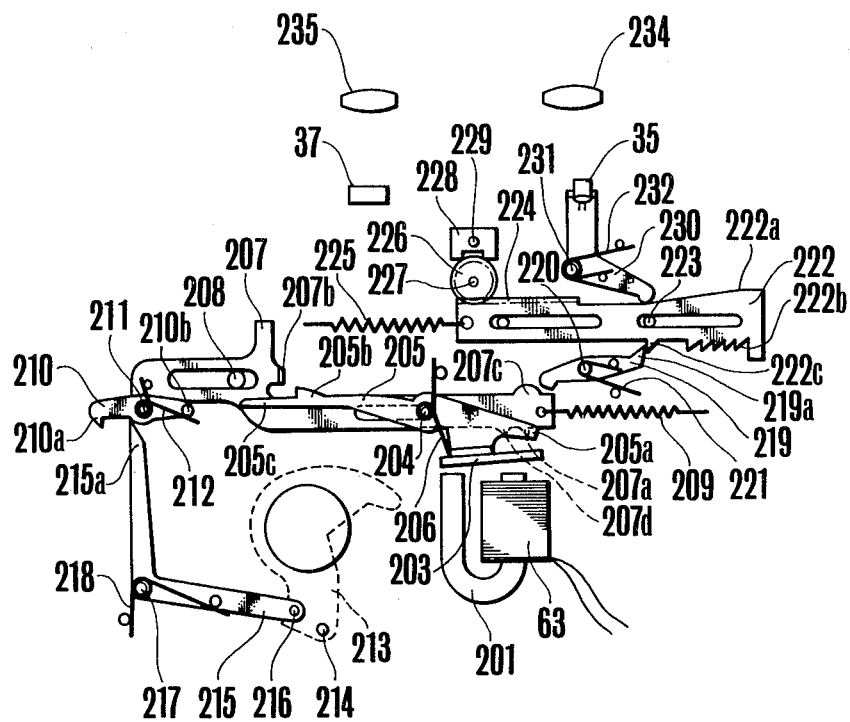
FIGS. 4 to 8 are elevational views of an example of the focusing and exposure control mechanism in different operational positions by which the operation is controlled in the circuit of FIG. 1 or 3.

Next, another embodiment, illustrated in FIG. 3, is different from the foregoing embodiment in that a self-timer function is added. That is, a timer circuit 100 is responsive to a trigger pulse at a trigger terminal T thereof for producing an output which is inverted to and maintained at H level for a prescribed period (for example, 10 seconds) depending upon a resistor 101 and a condenser 102. A self-switch 103 is closed when a self-timer actuator is operated. Reference numeral 104 identifies a pull-down resistor. An AND gate 105 has two inputs which are respectively connected to the output of the aforesaid timer circuit 100 and a point on the connection between the aforesaid self switch 103 and the aforesaid pull-down resistor 104. A transistor 106 has its base connected through a resistor to the output LT of the aforesaid AND gate 105 and its collector connected through a resistor to an LED for display of the self-timer exposure mode. The output LT of the AND gate 105 is also connected to one of the inputs of the OR gate 80'.

Operation of the circuit of FIG. 3 in the self-timer exposure mode is as follows:

When an electrical power source is thrown, the timer circuit 100 is reset by a PUC signal with its output taking L level. As an AFEND signal (accurately speaking, an AND signal of the AFEND signal and 128M signal) has arisen, when an RST signal is produced, the time circuit 100 is triggered, thereby its output is changed to and maintained at H level for a prescribed time. Also, since the SELF switch 103 is now in the closed position, the output of the AND gate 105 is also changed to and maintained at H level for the same time. This causes the frequency dividing circuit 71 and the D-FFs 72 to 79 to be cleared up through the OR gate 80'. Therefore, during this time period, the frequency dividing operation of the D-FFs 72 to 79 does not advance. Therefore, shutter release is hindered. That is, the self-timer operation goes on. At the termination of the aforesaid prescribed time, the output of the timer circuit 100 inverts to L level. Then, the output of the AND gate 105 inverts to L level, thereby the D-FFs 72 to 79 are released from the cleared state. As has been described in connection with the foregoing embodiment, a shutter operation succeeds. Also, during the operation of the self-timer, the switching transistor 106 energizes the LED 107, informing the user that the camera is under self-timer operation.

When the self-timer is not in use, because the switch 103 is open, the output of the AND gate 105 always holds L level. Therefore, clearing up of the D-FFs 72 to 79 does not occur, permitting the circuit of FIG. 3 to operate in a similar manner to that described in conjunction with the foregoing embodiment, while the self-timer is inoperative.

FIGS. 4 to 8 illustrate an arrangement of the mechanical parts in the camera using the electrical circuit of FIG. 1 or 3.

In the drawings, reference numeral 201 identifies a magnet yoke. This magnet yoke 201 is fixed to a shutter base plate (not shown). The magnet yoke 201 is also provided with a coil 63 illustrated in FIGS. 1 and 3 when supplied with current from the battery to form a magnetic field, and cooperates with an armature 203 which is arranged opposedly to its end in displaced relation by a slight gap. This armature 203 is attracted to the magnet yoke 201 when an attraction current flows to the coil 63, thereby a control lever 205 formed as a unit therewith is turned clockwise about a shaft 204 fixed to the shutter base plate. A spring 206 urges the control lever 205 counterclockwise as viewed in the drawings. Next, a drive member 207 in the form of a plate is slidingly movable to the right as is guided by a shaft 208 fixed to the shutter base plate as is the shaft 204, and is urged in the same direction by a spring 209 provided at one end. In this drive plate 207 there are provided an engagement portion 207 for engagement with a bent portion 205a provided in the armature side end portion of the control lever 205 when this device is in the initial position, and another engagement portion 207d for engagement with the bent portion 205a when the armature 203 is released from the 1st attraction by the magnet yoke 201, in adjacently spaced relation on the right side edge. On the opposite side edge there is provided an engagement portion 207b for engagement with a cutout portion 205b of the control lever 205, when the armature 203 is first attracted by the magnet yoke 201. As a result, the drive plate 207 moves stepwise to the right, as viewed in the drawings, as the magnet yoke 201 attracts and repels the armature 203.

An opening lever 210 is rotatably supported on a shaft 211 planted on the drive plate 207 and urged by a spring 212 counterclockwise, as viewed in the drawings. Also formed in one end of the opening lever 210 is a hooked portion 210a for engagement with an end portion 215a of a shutter opening and closing lever 215 when the stepwise movable drive slide moves to the final step, on the opposite end of which the lever 210 fixedly carries a pin 210 for turning the opening lever 210 clockwise in pushed relation by a pressing portion 205c of the control lever 205 when the hooked portion 210a is to be disengaged from the end portion 215a. A shutter blade 213 is pivotally mounted on a pin 214 fixed to the shutter base plate (not shown). It is to be noted that in actual practice, another shutter blade is provided which operates in a symmetric manner with the shutter blade 213. This shutter blade 213 is provided with an elongated slot (not shown) which is penetrated by a pin 216 planted on the shutter opening and closing lever 215 so that the shutter blades 213 move with the shutter opening and closing lever 215. The shutter opening and closing lever 215 is pivotally mounted on a shaft 217 and is urged counterclockwise by a spring 218.

Next a latch lever 219 is pivotally mounted on a shaft 220 fixed to the shutter base plate (not shown) and urged counterclockwise by a spring 221. In one end of this latch lever 219 is provided a hooked portion 219a for engagement with an initial position engagement portion 222c of an automatic focus adjustment control plate (hereinafter described as AF control plate). This engagement lapses when the drive plate 207 has moved one step from the initial position, as the opposite end portion of the latch lever 219 is pushed upwards, as viewed in the drawings, by an extension 207c of the drive plate 207.

The AF control plate 222 is guided by pins 223 and 224 fixed to the shutter base plate (not shown), and is urged leftward by a spring 225, as viewed in the drawings. Also, in a side portion of the AF control plate 222 is provided a toothed portion. This toothed portion meshes with a crown gear 226 the rotation of which is regulated by an anchor 228 swingingly mounted on a pin 229. Thereby the AF control plate 222 moves to the left as viewed in the drawings, while its speed of movement is adjusted to a constant value, when the hooked position 219a is disengaged from the initial position engagement portion 222c. Stoppage of this AF control plate 222 in the in-focus position is effected by the hooked portion 219a engaging with one of the teeth 222b of the AF control plate 222.

A light projection element lever 230 is pivotally mounted on a shaft 231 fixed to a camera housing or the like (not shown) and urged clockwise by a spring 232. One end of the lever 230 is in contact with a camming portion 222a provided in the side edge of the AF control plate 222, the opposite end of which fixedly carries a light projecting element IRED 35. Reference numeral 234 identifies a projection lens; reference numeral 235 identifies a collection lens; and a photosensitive element 37 illustrated in FIGS. 1 and 3, these parts being fixed to the camera housing (not shown). The aforesaid parts form a mechanism in the active type automatic focus detecting device known to those skilled in the art.

Also, the photographic lens cooperates with the AF control plate 222 through intermediary known to those skilled in the art so that focusing is automatically performed.

Figure 5:
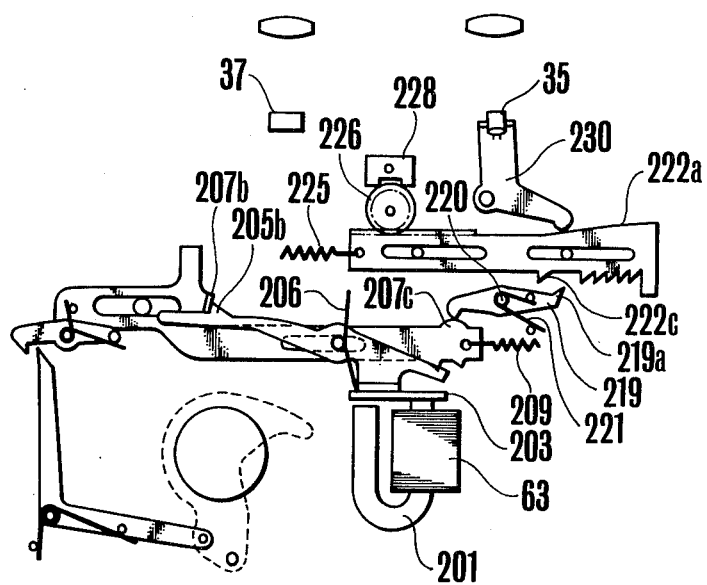

Next let us explain the operation of the mechanism of FIGS. 4 to 8. At first, when a 1st cycle of current supplied to the magnet coil 63 is initiated, as has been stated above, a magnetic force exerted in the magnet yoke 201 attracts the armature 203 from the position of FIG. 4 to the position of FIG. 5, thereby the control lever 205 is formed in unison with the armature 203 is turned about the shaft 204 to disengage the bent portion 205a at one end thereof from the engagement portion 207a of the drive plate 207. Thus, the drive plate 207 moves to the right, as viewed in the drawings, under the action of the spring 209. And, this movement of the drive plate 207 is stopped when the cutout portion 205b of the control lever 205 engages the engagement portion 207b of the drive plate 207, as illustrated in FIG. 5. Also, when movement of the drive plate 207 stops, one end of the latch lever 219 is lifted upward, as viewed in the drawings, by the lobe 207c of the drive plate 207, turning about the pivot shaft 220 against the bias force of the spring 221. Therefore, the hooked portion 219a of latch lever 219 is disengaged from the engagement portion 222c of the AF control plate 222. Then, the AF control plate 222 moves to the left, as viewed in the drawings, by the bias force of the spring 225. At this time, the speed adjusting mechanism of the crown gear 226 and the anchor 228 operates so that the AF control plate 222 moves at a constant prescribed speed. When this movement of the AF control plate 222 starts, the light projection element carrier or lever 230 is acted on by the camming surface 222a of the AF control plate 222. Thus, the automatic focus detecting device measures object distance by the IRED 35 and the photosensitive element 37.

When an AFEND signal is produced, and the current supplied to the magnet 63 is cut off, the attractive force of the magnet yoke 201 on the armature 203 in the position of FIG. 5 disappears. Then, the control lever 205 is turned counterclockwise by the bias force of the spring 206, thereby the cutout portion 204b is disengaged from the engagement portion 207b of the drive plate 207. Then, the drive plate 207 moves again to the right, as viewed in the drawings, under the action of the spring 209.

Figure 6:
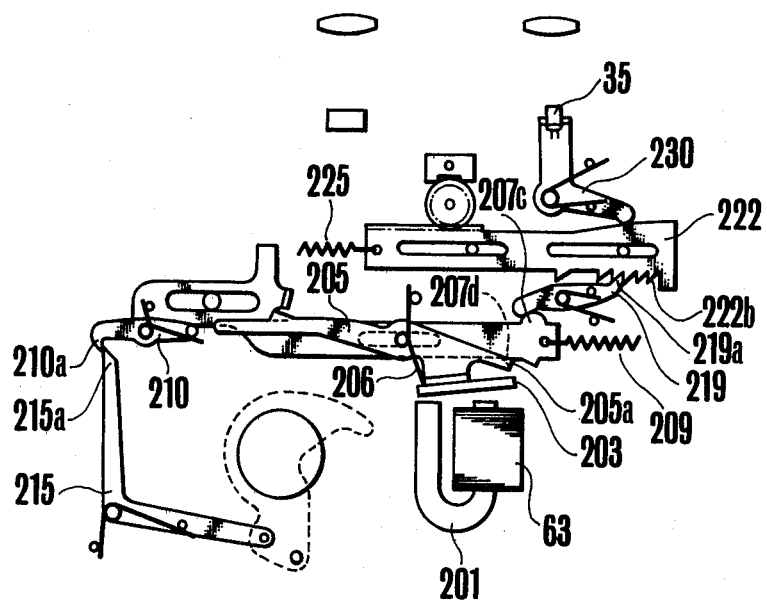

This movement of the drive plate 207 goes on until the engagement portion 207d of the drive plate 207 engages the bent portion 205a of the control lever 205, as illustrated in FIG. 6. Such movement of the drive plate 207 also causes disengagement of the lobe 207c of the drive plate 207 from the latch lever 219. Then, the latch lever 219 is turned counterclockwise by the bias force of the spring 221 so that the hooked portion 219a of the latch lever 219 engages the toothed portion 222b of the AF control plate 222, thereby the AF control plate 222 which has been moving to the left, as viewed in the drawings, is stopped. Thus, focusing of the photographic lens (not shown) is completed.

Figure 7:
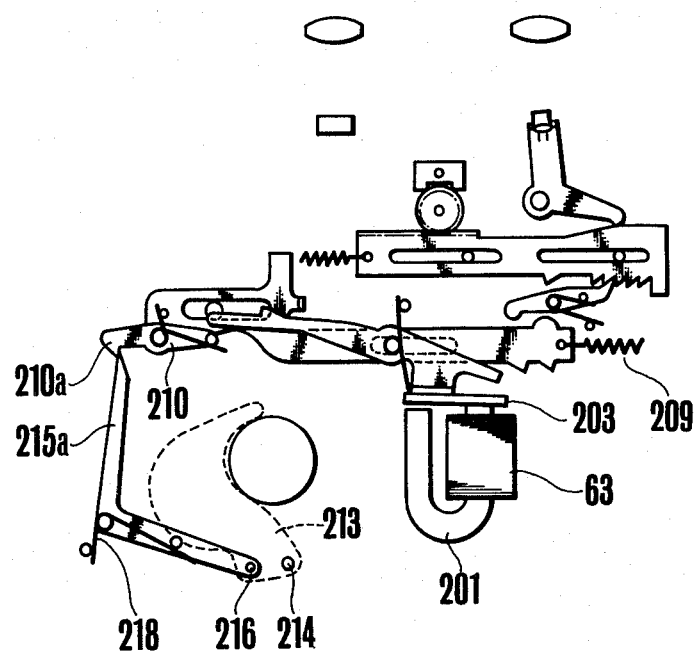
Figure 8:
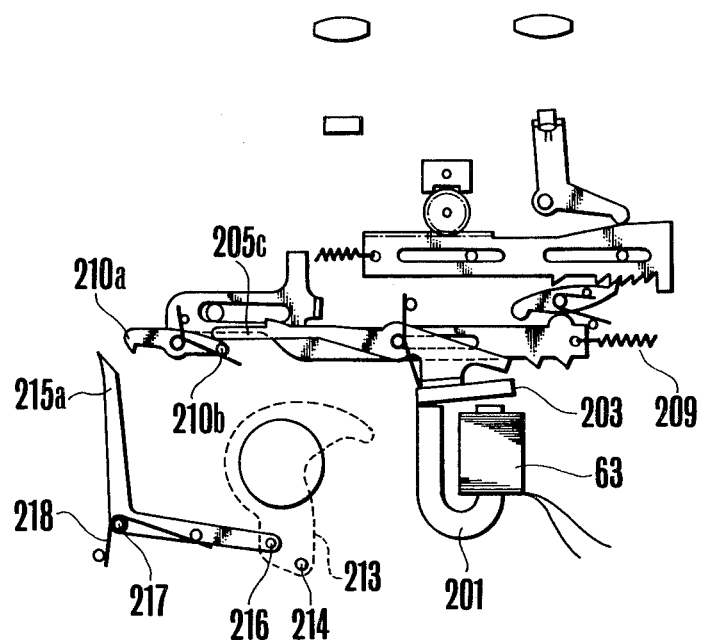

After that, when the magnet 63 is again supplied with current (2nd current supply), the magnet yoke 201 attracts the armature 203 again. The 2nd attraction to the armature 203 causes disengagement of the bent portion 205a of the control lever 205 from the engagement portion 207d of the drive plate 207. Then, the drive plate 207 moves to the right, as viewed in the drawings, by the bias force of the spring 209. Also, since at this time the hooked portion 210a of the opening lever 210 pivotally mounted on one end of the drive plate 207 is in engagement with the top end 215a of the shutter opening and closing lever 215, the shutter opening and closing lever 215 turns counterclockwise as the drive plate 207 moves, as illustrated in FIG. 7. Such movement of the shutter opening and closing lever 215 causes counterclockwise movement of the shutter blades 213 about the pivot pin 214, thus initiating an exposure. When the esposure is completed, the current supplied to the magnet coil 63 is stopped. Since, therefore, the attraction of the magnet yoke 201 to the armature 203 disappears, the control lever 205 is turned counterclockwise by the bias force of the spring 206, as illustrated in FIG. 8. At this time the pressor portion 205c of the control lever 205 pushes down from the pin 210b on the opening lever 210, thereby the hooked portion 210a is disengaged from the top end of the shutter opening and closing lever 215. As a result, the shutter opening and closing lever 215 turns counterclockwise under the action of the bias spring 218 while simultaneously turning the shutter blade 213 backwards. Thus, the shutter is closed.

As has been described above, the present invention differs from the prior art in that the great advantage of saving electrical energy from wasteful consumption is obtained, while still permitting the photographer to be able to obtain good shutter performance, as with the prior art device. With this invention, a great advance in the art has been achieved.

This also gives the additional advantage that as the automatic focus adjusting operation is not always completed for some reasons, since the subsequent operation such as the exposure operation is hindered from succeeding, the photographer is increasingly aware of a faulty operation.

The present invention is not confined to the illustrated embodiments. It is to be understood that the present invention is applicable to any of the known forms of mechanisms for automatic focus adjusting devices and for shutter devices.

What we claim:

1. A focusing device including:
   (a) a battery circuit;
   (b) an auto-focus circuit responsive to current supply from said battery circuit to operate, said circuit producing an output signal representing a termination of a focusing operation; and
   (c) prohibiting means for forcibly prohibiting the operation of said auto-focus circuit when said signal is not produced in a prescribed time after the initiation of the auto-focus operation.

2. A focusing device including:
   (a) a battery circuit;
   (b) an auto-focus circuit responsive to current supply from said battery circuit and having a focusing control circuit for carrying out a focusing operation in the current supplying state, and a sensing circuit for sensing the state of focusing operation upon detection of a proper focusing state to produce a detection output, whereby the focusing operation by said control circuit is stopped by said detection output to effect automatic focusing; and
   (c) prohibiting means for forcibly rendering said control circuit inoperative when said detection output is not produced in a prescribed time after said auto-focus circuit has been actuated to operate.

3. A focusing device according to claim 1, wherein said prohibiting means prohibits the operation of the auto-focus circuit by cutting off the current supply to the auto-focus circuit.

4. A focusing device according to claim 2, wherein said prohibiting means prohibits the focusing operation by hindering the current supply to said control circuit.

5. A focusing device according to claim 4, wherein said control circuit has drive control means rendering a focusing mechanism driven to move when in the current supplying state.

6. A focusing device according to claim 5, wherein said drive control means is an electromagnet means.

7. An in-focus distance finding device for a camera including:
   (a) a battery circuit;
   (b) a distance detecting circuit responsive to current supply from said battery circuit to take action for performing an in-focus distance condition sensing operation upon detection of an in-focus distance to produce an output signal; and
   (c) prohibiting means for prohibiting the operation of said distance detecting circuit when said output signal is not produced in a prescribed time from the initiation of the in-focus distance condition detecting operation by said distance detecting circuit.

8. A camera includes:
   (a) auto-focus means for performing a focusing operation;
   (b) an exposure circuit;
   (c) an operation control circuit for actuating said exposure circuit to operate after the focusing operation by said auto-focus means is terminated; and
   (d) prohibiting means for rendering said control circuit inoperative to prohibit the operation of said exposure circuit and stopping the operation of said auto-focus means when the focusing operation by said auto-focus means does not terminate in a prescribed time.

9. A camera including:
   (a) a battery circuit;
   (b) auto-focus means for performing a focusing operation;
   (c) an exposure circuit for initiating an exposure operation after the focusing operation by said auto-focus means is terminated;
   (d) a holding circuit for holding the state of current supply from said battery circuit to said auto-focus means and said exposure circuit; and
   (e) release means for releasing said holding means from the current supply holding to said exposure circuit when the focusing operation by said auto-focus means does not terminate in a prescribed time.

10. A camera including:
    (a) auto-focus means responsive to actuation of a release to be actuated to perform a focusing operation;
    (b) a self-timer circuit;
    (c) an exposure circuit arranged to be actuated after a time defined by said self-timer circuit;
    (d) a time counting circuit;
    (e) a co-ordination control circuit responsive to detection of a termination of the focusing operation by said auto-focus means within a 1st time defined by said time counting circuit for actuating said self-timer circuit to operate after the 1st time and responsive to detection of when the focusing operation does not terminate within said 1st time for actuating said self-timer circuit after the focusing operation has terminated.

* * * * *